United States Patent
Kim et al.

(10) Patent No.: US 8,528,746 B2
(45) Date of Patent: Sep. 10, 2013

(54) METHOD OF MANUFACTURING HYDROPHILIC MEMBRANE HAVING IMPROVED ANTIFOULING PROPERTY AND HYDROPHILIC MEMBRANE MANUFACTURED BY THE METHOD

(75) Inventors: Jaehoon Kim, Seoul (KR); Young Haeng Lee, Seoul (KR); Jae-Duck Kim, Seoul (KR); Jong Min Park, Seoul (KR); Jongsoo Jurng, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 405 days.

(21) Appl. No.: 12/845,223

(22) Filed: Jul. 28, 2010

(65) Prior Publication Data

US 2011/0253621 A1    Oct. 20, 2011

(30) Foreign Application Priority Data

Apr. 16, 2010    (KR) .................. 10-2010-0035417

(51) Int. Cl.
| | |
|---|---|
| B01D 39/00 | (2006.01) |
| B01D 29/00 | (2006.01) |
| B01D 39/14 | (2006.01) |
| B01D 71/26 | (2006.01) |
| B01D 3/12 | (2006.01) |
| B01D 67/00 | (2006.01) |

(52) U.S. Cl.
USPC ............ 210/500.35; 210/500.41; 210/500.42; 210/490; 264/48; 427/350

(58) Field of Classification Search
USPC .................. 210/490, 500.35, 500.27, 500.36, 210/500.41, 645, 500, 42; 264/48; 427/350, 427/384, 430.1, 443.2
See application file for complete search history.

(56) References Cited

U.S. PATENT DOCUMENTS

| 4,302,334 A | 11/1981 | Jakabhazy et al. |
| 4,311,573 A | 1/1982 | Mayhan et al. |
| 4,619,533 A * | 10/1986 | Lucas et al. .................. 374/141 |

(Continued)

FOREIGN PATENT DOCUMENTS

WO    9808595 A2    3/1998

OTHER PUBLICATIONS

Wang, P. et al., "Antifouling poly(vinylidene fluoride) microporous membranes prepared via plasma-induced surface grafting of poly-(ethylene glycol)," J. Adhesion Sci. Technol. vol. 16, No. 2, (2002) pp. 111-127.

(Continued)

Primary Examiner — Ana Fortuna
(74) Attorney, Agent, or Firm — Ladas & Parry LLP

(57) ABSTRACT

A method of manufacturing a hydrophilic membrane and hydrophilic membranes having improved antifouling property using a supercritical fluid or a subcritical fluid. The method involves combining a coating solution from a hydrophilic group-containing monomer, an initiator, a cross-linking agent and a supercritical fluid or subcritical fluid in a high pressure solution vessel and transferring the coating solution to a membrane in a high pressure coating vessel, coating the surfaces and micropores of the membranes through cross-linking polymerization reactions. Non-reacted coating material is returned to the high pressure solution vessel. The membranes are removed from the coating vessel, cleaned and dried. The hydrophilic membrane manufactured by the present invention is excellent in properties of hydrophobic membranes such as thermal stability, chemical stability and mechanical strength, and surfaces and micropores of the membranes are uniformly coated.

17 Claims, 6 Drawing Sheets

(56) References Cited

U.S. PATENT DOCUMENTS

| | | | |
|---|---|---|---|
| 4,944,879 A * | 7/1990 | Steuck | 210/500.27 |
| 4,994,879 A * | 2/1991 | Hayashi | 257/432 |
| 5,019,260 A | 5/1991 | Gsell et al. | |
| 5,066,401 A | 11/1991 | Muller et al. | |
| 5,122,273 A | 6/1992 | Rekers et al. | |
| 5,503,746 A | 4/1996 | Gagnon | |
| 5,736,051 A | 4/1998 | Degen et al. | |
| 6,083,393 A * | 7/2000 | Wu et al. | 210/500.35 |
| 6,270,844 B2 * | 8/2001 | McClain et al. | 427/384 |
| 6,280,853 B1 | 8/2001 | Mickols | |
| 6,618,533 B2 * | 9/2003 | Ma et al. | 385/123 |
| 7,607,058 B2 | 10/2009 | Whetsel | |
| 7,771,818 B2 * | 8/2010 | Klare et al. | 428/319.3 |
| 7,868,112 B2 * | 1/2011 | Oikawa et al. | 526/279 |
| 7,989,567 B2 * | 8/2011 | Sugiyama et al. | 526/224 |
| 2004/0188353 A1 * | 9/2004 | Ohnishi | 210/656 |
| 2006/0201874 A1 * | 9/2006 | Klare et al. | 210/500.36 |
| 2009/0188857 A1 * | 7/2009 | Moore et al. | 210/500.34 |
| 2011/0253621 A1 * | 10/2011 | Kim et al. | 210/500.39 |

OTHER PUBLICATIONS

Wavhal, D.S. et al., "Membrane Surface Modification by Plasma-Induced Polymerization of Acrylamide for Improved Surface Properties and Reduced Protein Fouling," Langmuir vol. 19, No. 1 (2003) pp. 79-85.

Chen, Y. et al., "Poly(vinylidene fluoride) with Grafted Poly(ethylene glycol) Side Chains via the RAFT-Mediated Process and Pore Size Control of the Copolymer Membranes," Macromulecules, vol. 36, No. 25 (2003), pp. 9451-9457.

* cited by examiner

METHOD OF MANUFACTURING HYDROPHILIC MEMBRANE HAVING IMPROVED ANTIFOULING PROPERTY AND HYDROPHILIC MEMBRANE MANUFACTURED BY THE METHOD

CROSS-REFERENCES TO RELATED APPLICATION

This patent application claims the benefit of priority from Korean Patent Application No. 10-2010-0035417, filed on Apr. 16, 2010, the contents of which are incorporated herein by reference.

BACKGROUND OF THE INVENTION

1. Field of the Invention

The present invention relates to a method of manufacturing a hydrophilic membrane having improved antifouling property and the hydrophilic membrane manufactured by the method.

2. Description of the Related Art

A process based on membranes is an energy saving type process which is not accompanied by phase, temperature and pressure changes that are inevitably accompanied in most separation processes, wherein importance of the process is greatly being magnified by combining the process of using membranes with various separation devices and developing materials for the membranes such that the process has recently been utilized in various fields including seawater desalination, food processing, various wastewater treatment, ultrapure water preparation, blood dialysis and filtration, and blood plasma separation. Solutes dissolved into various types of water such as colloid, bacteria, oil, protein, salts, viruses and others, or salts dissolved into water are capable of being removed using the membranes. The types of the membranes may include microfiltration membranes having a pore size of 0.1 to 100 μm, ultrafiltration membranes having a pore size of 0.005 to 0.5 μm, nanofiltration membranes having a pore size of 0.001 to 0.01 μm, reverse osmosis membranes having a pore size of greater than 0.001 μm, pervaporation membranes, gas separation membranes, etc., which are divided according to pore sizes and applications of the membranes. Membranes used particularly in the water treatment process or liquid/solid separating membrane process include microfiltration, ultrafiltration, nanofiltration, and reverse osmosis membranes. Important factors characterizing liquid/solid separating membranes showing superior performance may include excellent permeation flux, high selectivity and antifouling property.

Membranes having high water permeation flux are economically efficient by reducing the energy cost of pumping because water can penetrate through the membranes at a relatively low pumping pressure. In addition, membranes having uniform micropores can have high separation efficiency because separation efficiency with respect to the solute size are higher in the membranes having uniform micropores than in membranes having non-uniformed micropores.

Fouling of the membranes is one of the most important factors determining economic efficiency of the membrane-based separation process. Membrane fouling is characterized in that concentrates or excluded components such as proteins, cells, colloids and others dispersed or dissolved in a solution are adsorbed onto surface and micropores of the membranes, which results in a sharp decline of the permeation flux in the course of permeation period. The membrane fouling is caused by external fouling in which the excluded components are adsorbed onto the membrane surfaces to form a gel layer, a cake layer, a scale layer and other layers, and internal fouling causing adsorption of membrane pores and closure of the membrane pores. If such surface and micropores of the membranes are fouled, there is a problem that the permeation flux is rapidly decreased or properties of the membranes are varied with the passage of time to result in a deteriorating separation function of the membranes. A method of eliminating fouled contaminants adhered to the membranes at predetermined time intervals using a backwashing process and an air cleaning process individually or in combination in order to extend the life of the membranes has been used. However, in conclusion, the method results in deteriorating economic efficiency of the membrane process since much of energy is consumed due to frequent cleaning, a constant permeation flux cannot be obtained, and the membranes should be replaced due to impossible performance recovery of the membranes.

Polymeric materials for the membranes are mainly divided into hydrophilic polymers and hydrophobic polymers. The hydrophilic polymers for membrane materials may include cellulose-based polymers such as cellulose acetate, cellulose nitrate and the like, and polyamide-based polymers such as nylon and the like. The cellulose-based membranes have drawbacks that the cellulose-based polymers are very sensitive to heat, chemical resistance of the cellulose-based polymers is low, and main chains of the cellulose-based polymers are easily cleaved by enzyme and the like, although the cellulose-based polymers have characteristics that water is easily penetrated through the cellulose-based membranes by the interaction between water and the cellulose-based membranes such as hydrogen bonds and the like. On the other hand, the polyamide-based polymers are widely used particularly as materials for the reverse osmosis membranes due to their excellent mechanical properties, thermal stability and hydraulic stability. However, the polyamide-based polymers have drawbacks that it is difficult to manufacture polyamide-based polymers for microfiltration membranes or ultrafiltration membranes, and the polyamide-based polymers are strongly bonded with proteins to result in a severe fouling of the membranes.

The hydrophobic polymer materials may include polyethylene (PE), polypropylene (PP), polycarbonate (PC), polyimide (PI), polyetherimide (PEI), polysulfone (PSF), polyethersulfone (PES), polyvinylidene difluoride (PVDF), polytetrafluoroethylene (PTFE), and the like. The hydrophobic membranes are widely being used as materials for water treatment membranes due to their inherent advantages of excellent durability, mechanical strength, thermal stability and chemical resistance. However, the hydrophobic membranes have a drawback that a high trans-membrane pressure should be applied to allow water penetration through the hydrophobic membranes because there are no chemical functional groups that are capable of obtaining good interaction between water and the membrane such as hydrogen bonds and the like such that the hydrophobic membranes are not easily wetted by water. Furthermore, the hydrophobic membranes have a drawback that the hydrophobic membranes are extremely sensitive to membrane fouling compared to the hydrophilic polymer membranes.

In order to overcome such drawbacks, a method of hydrophilicizing surfaces of the hydrophobic membranes to retain beneficial bulk properties of the hydrophobic membranes such as chemical resistance, mechanical strength, thermal stability and chemical stability, and beneficial surface properties of the hydrophobic membranes such as high permeation flux and antifouling property has been suggested. The method typically includes a physical coating method, a polymer blending method, a grafting method, a coating method using a cross-linking reaction, a chemical treatment method, and others.

A physical coating method is a method of physically modifying the surface of the membranes by coating surface of hydrophobic membranes with hydrophilic polymer materials such as poly(vinyl pyrrolidone), poly(ethylene glycol), poly (vinyl alcohol), and the like. The physical coating method has a drawback that it is difficult to coat the internal micropores of the membranes uniformly because of the high surface tension and the high viscosity of coating solvents, typically water. In addition, high expenses are often required for post-treatment of the used coating solvents. Moreover, the physical coating method has a drawback that the hydrophilic polymer material is separated from the hydrophobic membrane surface during the membrane operation, resulting in lost of hydrophilicity and a drawback that the separated material is mixed with a filtrate, resulting in a contamination of the filtrate accordingly since the hydrophilic polymer material is dissolved in water when the manufactured membranes are brought into contact with water.

As disclosed in WO98/08595, and U.S. Pat. Nos. 5,066,401, 4,302,334, 5,122,273 and 5,503,746, polymer blending methods using hydrophilic polymers such as poly(ethylene glycol) and poly(vinyl pyrrolidone) have drawbacks that hydrophilicizing effects are insignificant when blending a small amount of hydrophilic polymer to form membranes, and film-forming conditions are varied to make it difficult to control pores of the membranes when using a large amount of hydrophilic polymer since hydrophilic polymer is present on bulks as well as surfaces of the membranes after forming the membranes. Further, the polymer blending methods have drawbacks that phase separation phenomena are generated due to inherent immiscibility between hydrophilic polymers and hydrophobic polymers, and the hydrophilic polymers are eluted during a long-term operation to result in a variation of filtration properties.

The grafting method is a method of hydrophilicizing the membranes by contacting the membranes with a solution containing acrylate monomers having hydrophilic groups and inducing a grafting reaction onto the surface of the membranes after forming radicals on the surface of membranes by irradiating high energy sources such as ultraviolet (UV) rays, electron beams (EB), ozone, plasma, gamma-rays and others as disclosed in U.S. Pat. Nos. 4,311,573, 5,019,260, 5,736,051, 6,280,853, and 7,607,058. However, the grafting method is not economically efficient since relatively expensive irradiation methods using high energy sources such as electron beams, plasma, gamma-rays and others should be used in the grafting method, and structure of an apparatus for the grafting method is complicated, and the grafting method has a problem that the membranes are destroyed permanently during irradiation of the high energy sources to result in decreased mechanical strength of the membranes. Further, the grafting method has a drawback that it is difficult to decrease internal fouling of the membranes since high viscosity and surface tension of the solvents make it difficult to penetrate the solvent into pores of the membranes and to perform uniform grafting into the inside pores of the membranes when using hydrophilic solvent such as water, alcohol or the like as the grafting solvents. The grafting method further has a drawback that micropores of the membranes are often clogged when grafting is excessively attempted to overcome the internal fouling of the membranes.

A coating method using a cross-linking reaction is a method of introducing hydrophilicity into the membranes by contacting the dissolved solution to the surface of the membranes and coating the surface of the membranes with the dissolved solution by a cross-linking reaction using heat, ultraviolet rays, electron beams or the like after dissolving a hydrophilic monomer, a cross-linking agent, an initiator and others into water or alcohol as disclosed in U.S. Pat. Nos. 4,994,879, 6,618,533 and others. The foregoing coating method has an advantage that the hydrophilic material is not eluted when hydrophilic material is brought into contact with water. However, the coating method has a disadvantage that it is difficult to uniformly coat micropores of the membranes because wettability of hydrophobic membranes with water or alcohol is very low. The coating method has disadvantages that the entire process becomes complicated, and the manufacturing cost is increased when a compression process using rollers is applied to overcome non-uniform coating in the micropores of the membranes.

Therefore, the present inventors have made an effort to solve the above-mentioned problems of the prior art. As a result of the effort, the present inventors have completed this invention by developing a method which is capable of uniformly coating surfaces and pores of the membranes using a supercritical fluid or a subcritical fluid that has excellent wettability and is easily penetrated into micropores of the membranes as a coating solvent, and which is capable of hydrophilicizing the entire membranes permanently through a cross-linking reaction.

SUMMARY OF THE INVENTION

One object of some embodiments of the present invention is to provide a method of manufacturing a hydrophilic membrane having improved antifouling property using a supercritical fluid or a subcritical fluid as a coating solvent.

Further, another object of some embodiments of the present invention is to provide a hydrophilic membrane having improved antifouling property manufactured by the method.

In order to achieve the objects, an embodiment of the present invention provides a method of manufacturing a hydrophilic membrane having improved antifouling property using a supercritical fluid or a subcritical fluid, the method comprising: a first step of introducing a hydrophilic group-containing monomer, an initiator and a cross-linking agent into a high pressure solution vessel, introducing a supercritical fluid or a subcritical fluid into the high pressure solution vessel, thereby dissolving a mixture of the hydrophilic group-containing monomer, initiator and cross-linking agent in the supercritical fluid or the subcritical fluid to prepare a coating solution; a second step of fixing membranes to an internal heater in a high pressure coating vessel, pressurizing the high pressure coating vessel such that a pressure of the high pressure coating vessel is identical to that of the high pressure solution vessel, and transferring coating material from the high pressure solution vessel to the high pressure coating vessel to contact the coating material with the membranes; a third step of coating the monomer, initiator and cross-linking agent contacted with the membranes in step 2 on surfaces and micropores of the membranes through a cross-linking reaction and a polymerization reaction; a fourth step of lowering temperature of the internal heater in the high pressure coating vessel and transferring non-reacted coating material to the high pressure solution vessel again; and a fifth step of lowering pressure of the high pressure coating vessel to the atmospheric pressure, recovering manufactured hydrophilicized membranes, and cleaning and drying the recovered hydrophilicized membranes.

Furthermore, the present invention provides a hydrophilic membrane having improved antifouling property manufactured by the method of the present invention.

According to the present invention, hydrophilization can be introduced to the surfaces and micropores of the membranes permanently by uniformly coating micropores as well as surfaces of the hydrophobic membranes with the dissolved solution after dissolving a hydrophilic monomer into a supercritical fluid or a subcritical fluid and contacting the dissolved solution with hydrophobic membranes. A membrane manufactured by the present invention is excellent in properties of a hydrophobic membrane such as thermal stability, chemical stability and mechanical strength, and has a high permeation flux and a low protein adsorption since the surfaces and micropores of the membrane are uniformly coated with hydrophilic material using a cross-linking reaction. Particularly, when a hydrophilicized membrane is manufactured by the present invention, a membrane having a high permeation flux and antifouling property is capable of being manufactured in various membrane processes including seawater desalination, food processing, various wastewater treatments, ultrapure water preparation, blood dialysis and filtration, and blood plasma separation.

BRIEF DESCRIPTION OF THE DRAWINGS

The above and other objects, features and other advantages of embodiments of the present invention will be more clearly understood from the following detailed description taken in conjunction with the accompanying drawings, in which.

EXPLANATION OF REFERENCE NUMERALS FOR MAIN PORTIONS IN DRAWINGS

Figure 1:
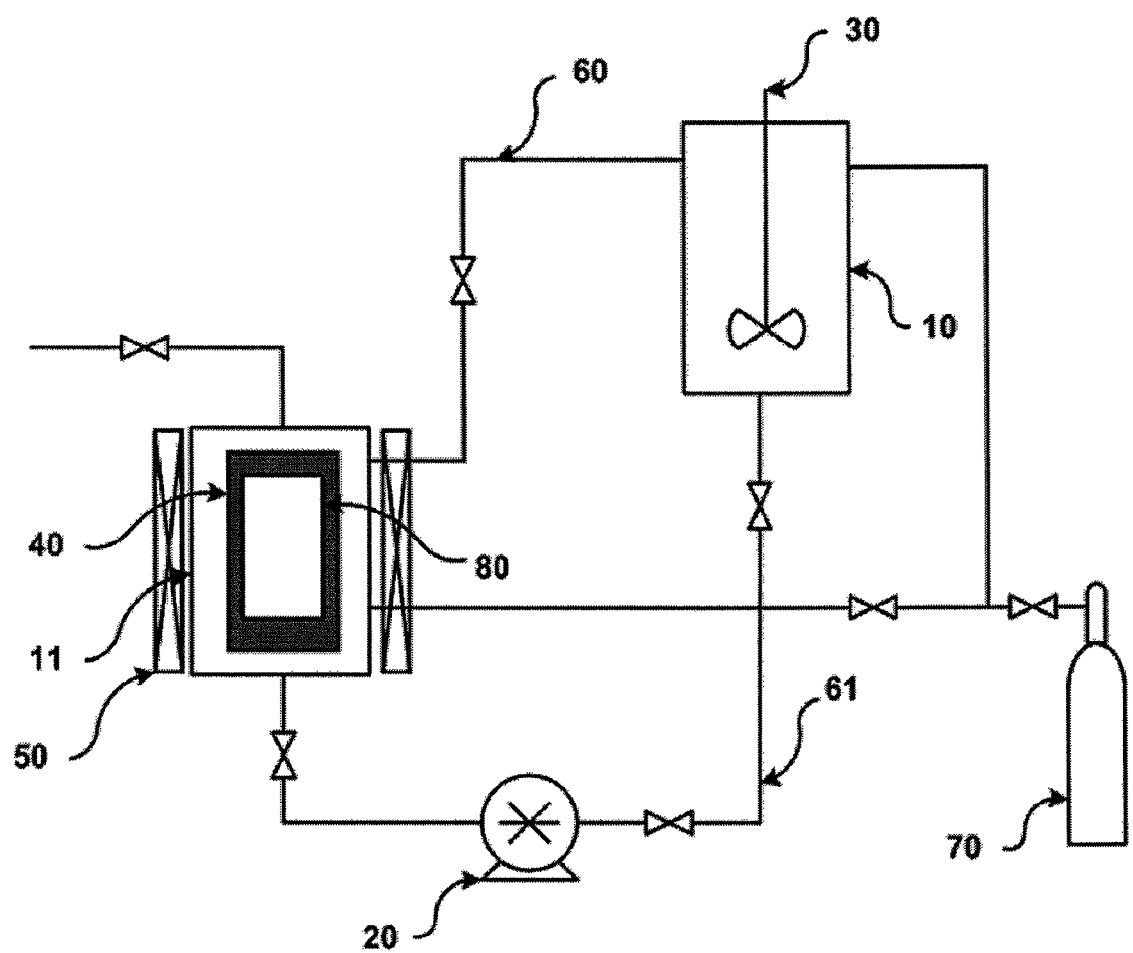
FIG. 1 illustrates an example of an apparatus for uniformly hydrophilicizing surfaces and micropores of membranes using a supercritical fluid or a subcritical fluid according to the present invention.

10: High pressure solution vessel
11: High pressure coating vessel
20: High pressure pump
30: High pressure magnetic stirrer
40: Internal heater
50: External heater
60: Gas passage line
61: Solution transfer line
70: Supercritical fluid or subcritical fluid vessel
80: Membrane

DESCRIPTION OF THE PREFERRED EMBODIMENTS

Features and advantages of the present invention will be more clearly understood by the following detailed description of the present preferred embodiments by reference to the accompanying drawings. It is first noted that terms or words used herein should be construed as meanings or concepts corresponding with the technical spirit of the present invention, based on the principle that the inventor can appropriately define the concepts of the terms to best describe his own invention. Also, it should be understood that detailed descriptions of well-known functions and structures related to the present invention will be omitted so as not to unnecessarily obscure the important point of the present invention.

The present invention provides a method of manufacturing a hydrophilic membrane having improved antifouling property using a supercritical fluid or a subcritical fluid, the method comprising: a first step of introducing a hydrophilic group-containing monomer, an initiator and a cross-linking agent into a high pressure solution vessel, introducing a supercritical fluid or subcritical fluid into the high pressure solution vessel, thereby dissolving a mixture of the hydrophilic group-containing monomer, initiator and cross-linking agent in the supercritical fluid or subcritical fluid to prepare a coating solution; a second step of fixing membranes to an internal heater in a high pressure coating vessel, pressurizing the high pressure coating vessel such that a pressure of the high pressure coating vessel is identical to that of the high pressure solution vessel, and transferring coating material from the high pressure solution vessel to the high pressure coating vessel to contact the coating material with the membranes; a third step of coating the monomer, initiator and cross-linking agent contacted with the membranes in Step 2 on surfaces and micropores of the membranes through a cross-linking reaction and a polymerization reaction; a fourth step of lowering temperature of the internal heater in the high pressure coating vessel and transferring non-reacted coating material to the high pressure solution vessel again; and a fifth step of lowering pressure of the high pressure coating vessel to the atmospheric pressure, recovering manufactured hydrophilicized membranes, and cleaning and drying the recovered hydrophilicized membranes.

Step 1 of a method of manufacturing a hydrophilic membrane according to the present invention is a step of introducing a hydrophilic group-containing monomer, an initiator and a cross-linking agent into a high pressure solution vessel, introducing a supercritical fluid or subcritical fluid into the high pressure solution vessel, thereby dissolving a mixture of the hydrophilic group-containing monomer, initiator and cross-linking agent in the supercritical fluid or subcritical fluid to prepare a coating solution.

The supercritical fluid or subcritical fluid in the present invention is a fluid in the supercritical state or a fluid in the subcritical state capable of dissolving the hydrophilic group-containing monomer, initiator and cross-linking agent in step 1. A supercritical fluid, more preferably supercritical carbon dioxide is excellent in solubility of organic materials such as hydrophilic monomers since supercritical carbon dioxide has a high density of 0.5 to 0.9 g/cm$^3$. Further, supercritical carbon dioxide has excellent wettability and can easily penetrate into micropores of the membrane since there is no surface tension in supercritical carbon dioxide. In addition, supercritical carbon dioxide has a viscosity of 0.1 centipoise, which is far lower than a viscosity of 0.5 to 1.5 centipoise of conventional organic solvents or water. Therefore, supercritical carbon dioxide has properties enabling supercritical carbon dioxide to be penetrated into the micropores of the membrane very easily. Furthermore, the coating material dissolved in supercritical carbon dioxide can penetrate into the micropores of the membrane very easily because supercritical carbon dioxide has zero surface tension and much lower viscosity than those of water or conventional organic solvents. Since most organic solvents or water has a high viscosity as well as a high surface tension, it is difficult to penetrate organic solvents or water into the micropores of the membrane such that the micropores of the membrane are nonuniformly coated. Further, supercritical carbon dioxide is economically efficient and environmentally friendly since it is possible to omit a process of treating waste liquid generated after the coating process by utilizing water or the conventional organic solvent since it is possible to recover or discharge supercritical carbon dioxide by simply decreasing pressure after the coating process.

In the present invention, a subcritical fluid, more preferably liquid carbon dioxide has physical properties similar to those of supercritical carbon dioxide. Since liquid carbon dioxide has a high density of 0.7 to 0.8 g/cm$^3$ at room temperature, liquid carbon dioxide retains excellent solubility of organic coating materials such as a hydrophilic monomer and others. In addition, liquid carbon dioxide has a viscosity of 0.1 centipoise at room temperature, which is much lower than viscosity of 0.5 to 1.5 centipoise of conventional organic solvents or water. Furthermore, liquid carbon dioxide has a surface tension of 5 dynes/cm or less at room temperature, which is significantly lower than that of the conventional organic solvents of 25 to 30 dynes/cm and is far lower than that of water of 72 dynes/cm. Additionally, the coating process using liquid carbon dioxide is capable of simplifying the apparatus and hydrophilicizing the membrane economically since pressure and temperature are lower in a coating process using liquid carbon dioxide than in a coating process using supercritical carbon dioxide.

The supercritical fluid or subcritical fluid in Step 1 is preferably selected from the group consisting of liquid carbon dioxide, supercritical carbon dioxide, supercritical 1,1,1,2-tetrafluoroethane (HFC 134a), supercritical difluoromethane (HFC 32), supercritical pentafluoroethane (HFC 125), supercritical methane, supercritical ethane, supercritical propane, and combinations thereof. The supercritical fluid retains excellent wettability of membrane surfaces since the supercritical fluid has zero surface tension and has a viscosity that is far lower than that of water or conventional organic solvents as illustrated in an example of supercritical carbon dioxide. Therefore, coating materials dissolved in the supercritical fluid can easily penetrate into the micropores of the membranes such that the micropores as well as surfaces of the membranes can be uniformly coated with the coating materials.

The hydrophilic group-containing monomer in Step 1 is preferably a monomer containing one or more hydrophilic groups selected from the group consisting of a hydroxyl functional group (—OH), a carboxyl acid functional group (—COOH), an alkylene oxide functional group (—R—O—), and an amine functional group (—NH2). A membrane having improved antifouling property can be manufactured by hydrophilicizing surfaces of the membranes using the hydrophilic group-containing monomer.

For instance, an acrylate-based monomer comprising a hydrohyl group may have the following formula.

[Chemical Formula 1]

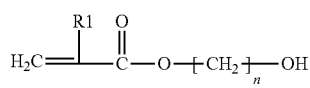

where R1 is H or CH$_3$, and n is an integer that can be selected between 1 and 10.

An acrylate-based monomer comprising an alkylene oxide group, particularly ethylene oxide group may have the following formula.

[Chemical Formula 2]

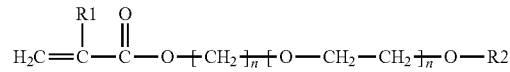

where R1 is H or CH$_3$, R2 is a hydrogen atom or a C1-C10 aliphatic or aromatic hydrocarbon, n is an integer capable of being selected between 0 and 10, and m is an integer capable of being selected between 1 and 200.

Typical examples of an acrylate-based monomer comprising an alkylene oxide group may include polyethylene glycol ethyl methacrylate (PEGMA), polyethylene glycol ethyl acrylate (PEGA), polyethylene glycol ethyl diacrylate (PEGDA), and polyethylene glycol ethyl dimethacrylate (PEGDMA).

In addition to the acrylate-based monomer comprising the alkylene oxide group, examples of a monomer comprising a hydrophilic group may include acrylic acid, methacrylic acid, acrylamide, vinyl pyrrolidone, and glycidyl methacrylate. However, the monomer comprising the hydrophilic group is not necessarily limited to the examples.

The monomer containing the hydrophilic group dissolved into the supercritical fluid or subcritical fluid preferably has a concentration of 0.1 to 20% by weight, more preferably has a concentration of 0.5 to 15% by weight. If the concentration of the monomer containing the hydrophilic group is less than 0.1% by weight, the hydrophilicization degree of the membrane is low because a dilute monomer concentration can result in decrease in permeation flux and an increase of protein adsorption. If the concentration of the monomer containing the hydrophilic group exceeds 20% by weight, micropores of the membrane can be clogged because a thick polymer coating can result in deterioration of permeation flux.

The cross-linking agent in Step 1 is preferably selected from the group consisting of acrylate, methacrylate, trimethylolpropane trimethylacrylate (TMPTMA), polyethylene glycol ethyl diacrylate (PEGDA) and polyethylene glycol ethyl dimethacrylate (PEGDMA) having two or more double bonds, and combinations thereof. The cross-linking agent can be organic material retaining two or more double bonds that can be dissolved in the supercritical fluid or the subcritical fluid, and that is capable of causing the cross-linking reaction. Preferably, examples of the cross-linking agent may include acrylate, methacrylate, trimethylolpropane trimethylacrylate (TMPTMA), polyethylene glycol ethyl diacrylate (PEGDA) and polyethylene glycol ethyl dimethacrylate (PEGDMA) having two or more double bonds. PEG having a molecular weight of 100 to 1,000 in PEGDA or PEGDMA may be used.

The cross-linking agent dissolved in the supercritical fluid or the subcritical fluid of Step 1 may have preferably a concentration of 0.001 to 10% by weight, more preferably a concentration of 0.005 to 5% by weight. If the concentration of the cross-linking agent is less than 0.001% by weight, coated hydrophilicizing polymer may be dissolved into water since the cross-linking reaction is unstable due to the low concentration of the cross-linking agent. If the concentration of the cross-linking agent exceeds 10% by weight, an excessive polymer cross-linking reaction in the bulk may block a flow in the pipe during the process.

The initiator in Step 1 is preferably selected from the group consisting of 2,2'-azobis(2-methylpropionitrile), 2,2'-azobis (4-methoxy-2,4-dimethyl valeronitrile), 2,2'-azobis(2,4-dimethyl valeronitrile), dimethyl 2,2'-azobis(2-methylpropionate), 2,2'-azobis(2-methylbutyronitrile), 1,1'-azobis (cyclohexane-1-carbonitrile), and combinations thereof. The initiator should be organic material which can be dissolved in the supercritical fluid or the subcritical fluid and can cause a polymerization of acrylate groups.

The initiator dissolved in the supercritical fluid or the subcritical fluid of Step 1 may have preferably a concentration of 0.0001 to 1% by weight, more preferably a concentration of 0.0005 to 0.1% by weight. If the concentration of the initiator is less than 0.0001% by weight, it is not possible to conduct an effective polymerization reaction of the monomers since the initiator concentration is too low. If the concentration of the initiator exceeds 1% by weight, it may not be possible to conduct an effective hydrophilicization since the length of chains is shortened during the polymerization of the monomers because the initiator concentration is too high.

In order to maintain the supercritical fluid state of Step 1, hydrophilicization of membranes may be performed in a high pressure coating vessel of which a temperature is 30 to 100 preferably 40 to 80° C., and of which a pressure is 40 to 500 bars, preferably 100 to 300 bars. If the temperature of the high pressure coating vessel is less than 30° C. and the pressure of the high pressure coating vessel is less than 40 bars, there are problems that permeation flux of the manufactured hydrophilicized membrane are decreased, and protein adsorption of the membrane is increased since solubility of the hydrophilic group-containing monomer, cross-linking agent and initiator in the supercritical fluid or subcritical fluid are lowered. If the temperature of the high pressure coating vessel exceeds 100° C. and the pressure of the high pressure coating vessel exceeds 500 bars, there are problems that economic efficiency decreases since the high pressure coating vessel should be maintained to high temperatures and high pressures, and it is not possible to carry out hydrophilicization of the membrane efficiently since a polymerization reaction and a cross-linking reaction of polymers are performed in the bulk phase of the supercritical fluid.

In order to maintain a subcritical fluid state, particularly a liquid carbon dioxide state of Step 1, hydrophilicization of membranes may be performed in a reactor of which a temperature is 0 to 30° C., preferably 5 to 25° C., and of which a pressure is 30 to 200 bars, preferably 50 to 100 bars. It is not economically efficient to control the temperature of the reactor to less than 0° C. since the cooling process should be accompanied to maintain the reactor to low temperatures. If the pressure of the reactor is less than 30 bars, there are problems that permeation flux of the manufactured hydrophilicized membrane are decreased, and protein adsorption of the membrane is increased since solubility of the hydrophilic group-containing monomer, cross-linking agent and initiator in liquid carbon dioxide are lowered. If the temperature of the reactor exceeds 30° C. and the pressure of the reactor exceeds 100 bars, there is a problem that economic efficiency decreases since the reactor should be maintained to high temperatures and high pressures.

Step 2 according to the present invention is a step of fixing membranes to an internal heater in a high pressure coating vessel, pressurizing the high pressure coating vessel such that a pressure of the high pressure coating vessel is identical to that of the high pressure solution vessel, and transferring coating material from the high pressure solution vessel to the high pressure coating vessel to contact the coating materials with the membranes.

A contact time between the membranes and the coating materials of the hydrophilic group-containing monomer, cross-linking agent and initiator dissolved in the supercritical fluid or the subcritical fluid may be 10 minutes to 48 hours, preferably 30 minutes to 24 hours. If the contact time is less than 10 minutes, uniform hydrophilicization may not be performed into micropores of the membranes as well as onto surfaces of the membranes since the contact time is shorter than a time taken when the coating materials are penetrated into the micropores, which can result in nonuniform contact the coating materials with the micropores of the membranes. If the contact time is not less than 48 hours, productivity may deteriorate since the contact between the coating materials and the membranes should be maintained for a long time.

Step 3 according to the present invention is a step of coating the monomer, initiator and cross-linking agent contacted with the membranes in Step 2 on surfaces and micropores of the membranes through a cross-linking reaction and a polymerization reaction.

Heat may be mainly used in Step 3 as a process of hydrophilicizing the membranes by a polymerization reaction and a cross-linking reaction of the hydrophilic group-containing monomer, cross-linking agent and initiator adsorbed onto surfaces of membranes, wherein it is desirable that a reaction temperature is not less than an initiating temperature if the initiator. More specifically, the reaction temperature is 30 to 150° C., and the reaction temperature is preferably 60 to 100° C. If the reaction temperature is less than 30° C., it may be impossible to effectively perform the polymerization reaction and cross-linking reaction since the initiator cannot produce radicals effectively. If the reaction temperature exceeds 100° C., economic efficiency decreases since a high temperature has to be maintained, and the membranes may deteriorate since the membranes are exposed to high temperatures for a long time. A reaction time is 10 minutes to 10 hours, and the reaction time is preferably 30 minutes to 5 hours. If the reaction time is less than 10 minutes, it may be not possible to perform the polymerization reaction and cross-linking reaction effectively. If the reaction time is not less than 10 hours, it is not economically efficient and productivity may deteriorate since the reaction temperature has to be maintained for a long time.

Step 4 according to the present invention is a step of lowering temperature of the internal heater in the high pressure coating vessel and transferring non-reacted coating material to the high pressure solution vessel again.

The foregoing step is a step of separating non-reacted monomer, initiator and cross-linking agent dissolved in the supercritical fluid or the subcritical fluid from the hydrophilicized membranes. The membranes may be separated by discharging the supercritical fluid to the outside of a reactor when using the supercritical fluid. The membranes may be separated by lowering an internal pressure of the reactor after transferring a liquid carbon dioxide solution to the high pressure solution vessel using a high pressure pump when using the subcritical fluid, particularly liquid carbon dioxide.

Step 5 according to the present invention is a step of lowering pressure of the high pressure coating vessel to the atmospheric pressure, recovering manufactured hydrophilicized membranes, and cleaning and drying the recovered hydrophilicized membranes.

In Step 5, a process of cleaning and drying the hydrophilicized membranes may be further performed. A general method of cleaning non-reacted monomer, initiator and cross-linking agent physically adsorbed onto the hydrophilicized membranes using water or organic solvents may be used in the cleaning process, and vacuum drying or oven drying is suitably employed in the drying process. It is preferable to use methanol, ethanol and tetrahydrofuran as the organic solvents since methanol, ethanol and tetrahydrofuran are suitable for dissolving the non-reacted monomer, initiator and cross-linking agent.

Furthermore, the present invention provides a hydrophilic membrane having improved antifouling property manufactured by the foregoing method.

The hydrophilic membranes manufactured by the current art have a high permeation flux and a low protein adsorption since surfaces and micropores of the membrane are uniformly coated with hydrophilic material using a cross-linking reaction in the supercritical fluid or the subcritical fluid. In addition the hydrophilic membranes manufactured by the manufacturing method of the present invention retain excellent properties of hydrophobic membranes such as thermal stability and chemical stability and has superior mechanical strength. Therefore, the hydrophilic membrane is capable of being applied to microfiltration membranes, ultrafiltration membranes, nanofiltration membranes and reverse osmosis membranes in which antifouling property is required.

Hereinafter, the present invention will be described in more detail with reference to the following examples and experimental examples. However, the following examples and experimental examples are provided for illustrative purposes only, and the scope of the present invention should not be limited thereto in any manner.

Example 1

1 g of polyethylene glycol diacrylate (PEGDA, Mn of 575 g/mol) containing a hydrophilic functional group and a cross-linking reaction-enabling group was introduced into a high pressure solution vessel of 1500 ml of which a temperature was controlled to 15° C., and 0.03 g of 2,2'-azobis(2-methylpropionitrile) (AIBN) as an initiator was introduced into the high pressure solution vessel. 1200 ml of liquid carbon dioxide was introduced into the high pressure solution vessel to adjust the monomer concentration to 0.1% by weight, and a pressure of the vessel was controlled to 50 bars. The solution was stirred for 2 hours by a high pressure magnetic stirrer to prepare a uniform coating solution. After adjusting a polyvinylidene difluoride (PVDF) MF membrane having an average pore size of 0.45 μm and a thickness of about 30 μm to a size of 20×10 cm$^2$ and fixing the size-adjusted PVDF MF membrane to an internal heater having a size of 21×11 cm$^2$ installed in a high pressure coating vessel, and pressurizing the high pressure coating vessel with gaseous carbon dioxide to control a pressure of the vessel to 50 bars, a gas passage line was opened to equalize a pressure of the high pressure solution vessel and that of the high pressure coating vessel. Subsequently, the coating solution prepared in the high pressure solution vessel was transferred into the high pressure coating vessel through a liquid transfer line using a pump such that the coating solution could be contacted with the PVDF MF membrane for 6 hours. A hydrophilicizing reaction of the PDVF MF membrane was performed by increasing temperature of the internal heater to 70° C., thereby inducing a polymerization reaction and a cross-linking reaction in the vicinity of the surface and the micropores of the PDVF MF membrane in carbon dioxide. After lowering temperature of the internal heater to 15° C., unreacted monomer and initiator that may remain in the high pressure coating vessel were transferred to the high pressure solution vessel. After lowering pressure of the high pressure coating vessel to the atmospheric pressure and recovering the hydrophilicized PDVF MF membrane, the hydrophilicized PDVF MF membrane was cleaned with water for 24 hours to eliminate non-cross linked PEGDA and the initiator that may remain on the surface and in the micropores of the PVDF MF membrane.

Example 2

A hydrophilicized PVDF MF membrane was manufactured by the same method as in the Example 1 except that 4.95 g instead of 1 g of polyethylene glycol diacrylate (PEGDA, Mn of 575 g/mol) containing a hydrophilic functional group and a cross-linking reaction-enabling group was used, and 0.16 g instead of 0.03 g of 2,2'-azobis(2-methylpropionitrile) (AIBN) as an initiator was used.

Example 3

A hydrophilicized PVDF MF membrane was manufactured by the same method as in the Example 1 except that 9.95 g instead of 1 g of polyethylene glycol diacrylate (PEGDA, Mn of 575 g/mol) containing a hydrophilic functional group and a cross-linking reaction-enabling group was used, and 0.32 g instead of 0.03 g of 2,2'-azobis(2-methylpropionitrile) (AIBN) as an initiator was used.

Example 4

A hydrophilicized PVDF MF membrane was manufactured by the same method as in the Example 1 except that 9.1 g of polyethylene glycol methacrylate (PEGMA, Mn of 360 g/mol) instead of 1 g of polyethylene glycol diacrylate (PEGDA, Mn of 575 g/mol) was used as a hydrophilic group-containing monomer, and 0.9 g of trimethylolpropane trimethylacrylate (TMPTMA) was used as a cross-linking agent.

Example 5

A hydrophilicized PVDF MF membrane was manufactured by the same method as in the Example 1 using supercritical carbon dioxide at 40° C. and 200 bars instead of liquid carbon dioxide as the above-mentioned supercritical fluid or subcritical fluid.

Comparative Example 1

A hydrophobic PVDF MF membrane before coating was used in order to compare the hydrophobic PVDF MF membrane with a hydrophilic membrane according to the present invention.

Comparative Example 2

A hydrophilic PVDF MF membrane which was commercially available and had an average pore size of 0.45 μm and a thickness of about 30 μm was used in order to compare the commercial hydrophilic PVDF MF membrane with a hydrophilic membrane according to the present invention.

Experimental Example 1

Characteristic Analysis of Hydrophilic Membrane I

A Fourier transform infrared spectroscopy (hereinafter referred to as "FT-IR") manufactured by Thermo Electron Corporation was used in order to confirm whether the membrane manufactured by the manufacturing method of the present invention had been hydrophilicized or not.

Figure 2:
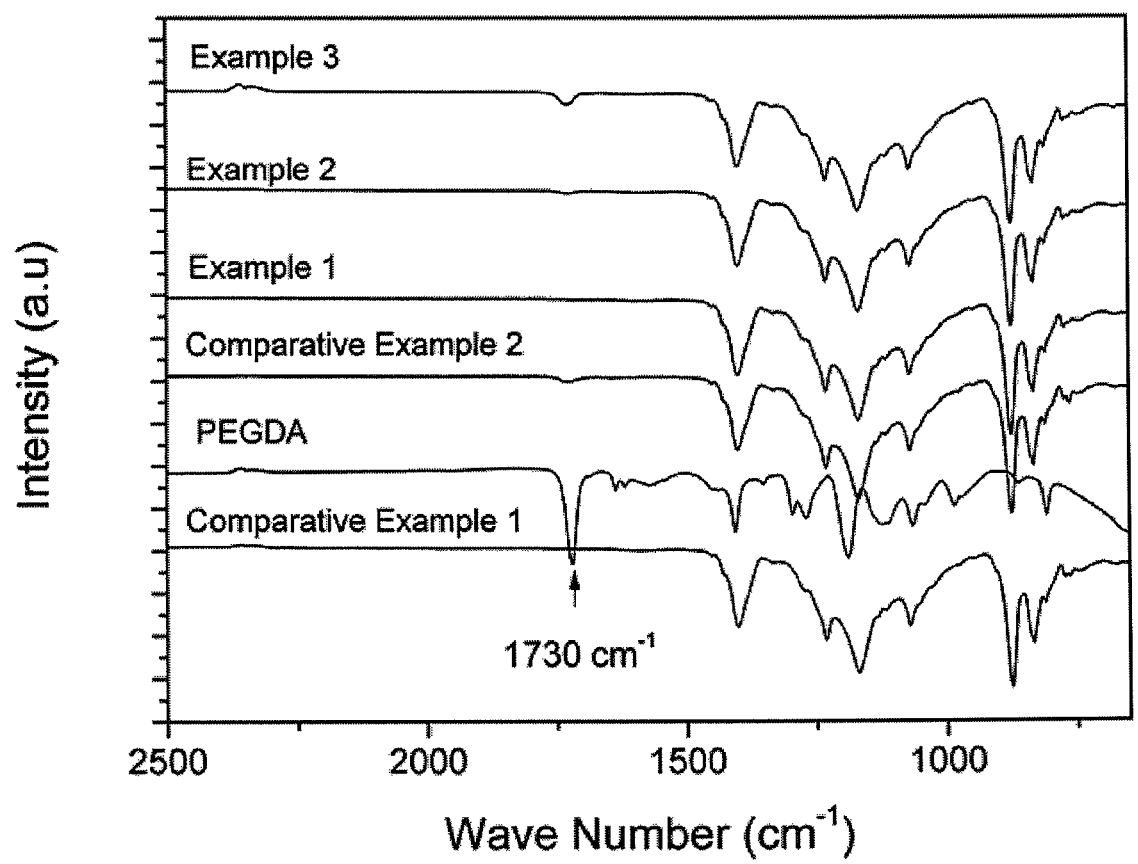
FIG. 2 illustrates FT-IR results of a PDVF MF membrane hydrophilicized after cleaning.

As illustrated in FIG. 2, one of PEGDA characteristic peaks, C=O stretching vibration peak (1730 cm$^{-1}$) was rarely detected when the PEGDA concentration used for hydrophilicizing the surfaces of PVDF MF membranes in Examples 1 and 2 is low. However, when a large amount of PEGDA was used in the example 3, the C=O stretching vibration peak was clearly detected in the hydrophilic PVDF MF membrane. On the other hand, it was confirmed that C=O stretching vibration peak was not detected in the pristine PVDF MF membrane before coating in the comparative example 1, and C=O stretching vibration peak was detected in a commercially available hydrophilic PVDF MF membrane in the comparative example 2.

Experimental Example 2

Characteristic Analysis of Hydrophilic Membrane II

An X-ray photoelectron spectroscopy manufactured by Physical Electronic Corporation was used to confirm whether the membrane manufactured by the manufacturing method of the present invention had been hydrophilicized or not.

Figure 3:
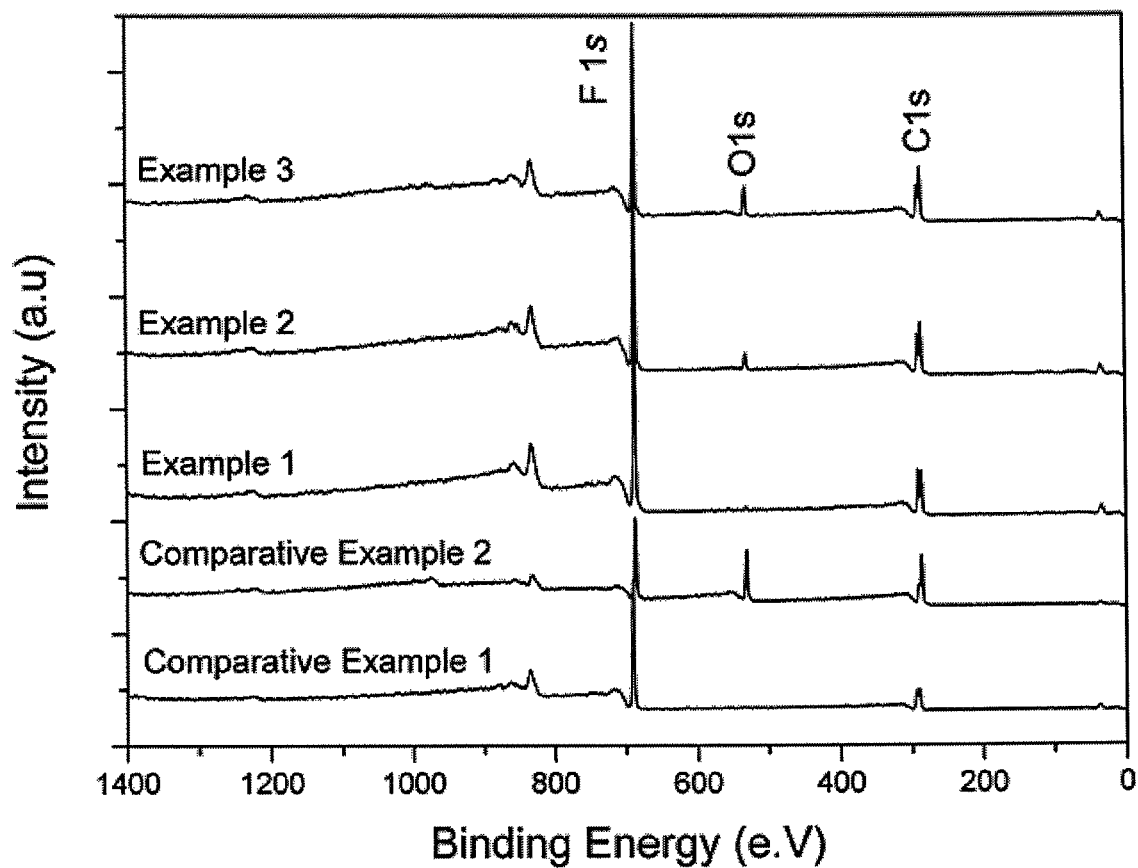
FIG. 3 illustrates XPS results of a PDVF MF membrane hydrophilicized after cleaning.

As illustrated in FIG. 3, it was confirmed that oxygen included in PEGDA was detected when hydrophilicizing surfaces of PVDF MF membranes using PEGDA from examples 1 to 3. Therefore, it was confirmed that cross-linked PEGDA was successfully coated on the PVDF MF membranes by a polymerization reaction and a cross-linking reaction. Furthermore, it could be seen that the amount of oxygen was increased from 0.9 to 8.4 when the amount of PEGDA used from the examples 1 to 3 was increased when calculating the quantification with respect to an oxygen peak in FIG. 3. Therefore, it was confirmed that hydrophilicization degrees of the PVDF MF membranes could be controlled by adjusting the amount of PEGDA used. On the other hand, it was confirmed that oxygen was not detected in the pristine PVDF MF membrane before coating in the comparative example 1, and oxygen was detected in a commercially available hydrophilic PVDF MF membrane in the comparative example 2.

Experimental Example 3

Surface Morphology Analysis of Hydrophilic Membrane

A scanning electron microscopy (hereinafter referred to as "SEM") manufactured by Hitachi Corporation was used to analyze the surface morphology of a hydrophilic membrane.

Figure 4:
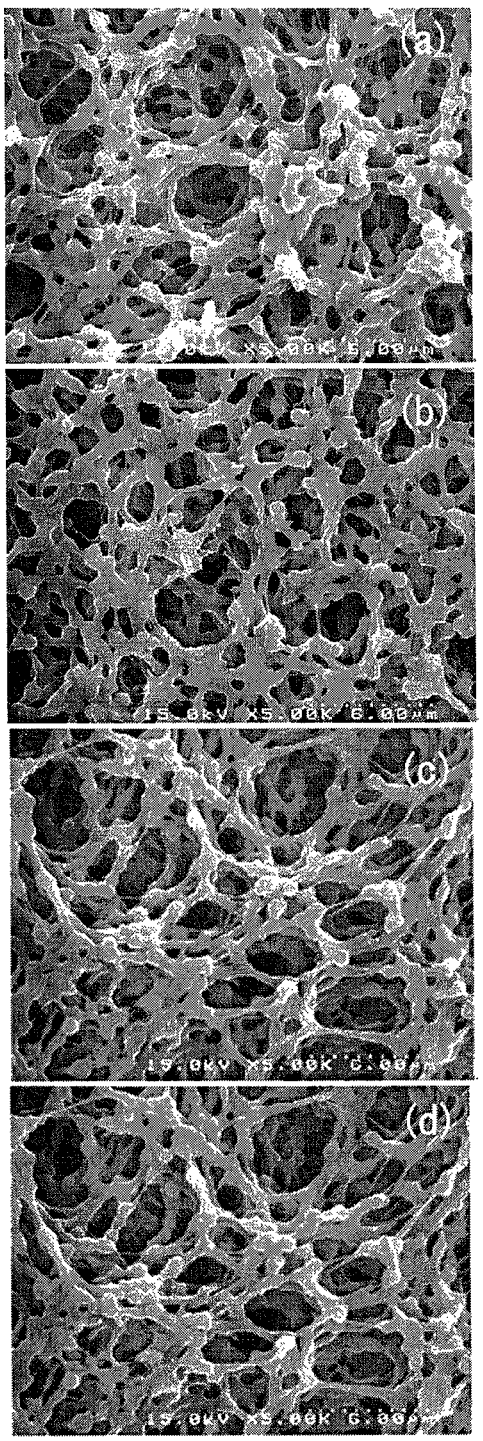
FIG. 4 illustrates SEM results of a PDVF MF membrane hydrophilicized after cleaning, wherein (a) to (d) are respectively SEM images of Comparative Example 1, Example 1, Example 2 and Example 3.

As illustrated in FIG. 4, there is little change in the surface morphology between the pristine PVDF MF membrane before coating in the comparative example 1 and hydrophilic PVDF MF membranes using liquid carbon dioxide in examples 1 to 3. Therefore, it could be seen that hydrophilicizing coating resulted in a very thin film coating in case of coating using liquid carbon dioxide.

Experimental Example 4

Permeation Characteristic Measurement of Membrane

An external reduced pressure type dead-end filtration apparatus was used in order to confirm permeation characteristics of a membrane manufactured by the manufacturing method of the present invention. Three membrane permeation tests were performed to confirm permeation characteristics of membranes, and the membrane permeation tests are described in detail as follows.

First the membrane was cut to a circular shape with a diameter of 1.8 cm and was mounted onto a filter holder. Double distilled and deionized (DDI) water in which 0.1 M of a phosphate buffer solution (PBS) had been added was first penetrated into the membrane to obtain an inherent resistance value of the membrane itself. Subsequently, a solution in which 1,000 mg/L of bovine serum albumin (BSA) and 0.1 M of PBS had been added was penetrated into the membrane to evaluate antifouling property of the membrane with respect to dissolved protein. After completing the permeation tests, the membrane was dismounted from the filtration system. The surface of the membrane was cleaned with 0.1 M of PBS solution three times by spraying to remove a cake layer formed on the surface of the membrane. The cleaned membrane was mounted onto the filter holder again to penetrate DDI water in which 0.1 M of PBS had been added into the membrane. All solutions used in the permeation tests exhibited a pH of 7.4 by the addition of 0.1 M of PBS. Flux and permeability factor values were calculated as follows by using resulting values of the foregoing membrane permeation tests. Further, membrane resistance values were calculated using a resistance in-series model, $J=\Delta P/[\mu \times (R)]$, which had been widely known as a membrane permeation related mathematical model, wherein J is a permeate flux, $\Delta P$ is a transmembrane pressure, $\mu$ is a viscosity of the permeate, and R is a membrane resistance. The respective resistance values were calculated through the above-described permeation tests, and permeation characteristics of the membranes were compared with one another based on the calculated resistance values.

Permeate flux (J)=permeate volume/(membrane area× permeation time)(L/m$^2$-hr, LMH)

Permeability (P)=permeate flux/transmembrane pressure (LMH/psi)

Membrane resistance (R)=transmembrane pressure/ (permeate flux×viscosity of the permeate)(m$^{-1}$)

Total membrane resistance (Rt)=Rm (inherent resistance of the membrane)+Rc (Resistance of a cake layer on the surface of the membrane or external fouling resistance of the membrane)+Ri (internal fouling resistance of the membrane)

In order to quantitatively analyze protein fouling characteristics of the membrane manufactured by the manufacturing method of the present invention, the amount of BSA adsorbed onto the fouled membrane was estimated by quantitatively measuring concentrations of BSA contained in solutions before and after permeation of the membrane using UV absorbance analysis with a protein-dye binding method and by quantitatively measuring the concentrations of BSA using a Bradford assay method.

Figure 5:
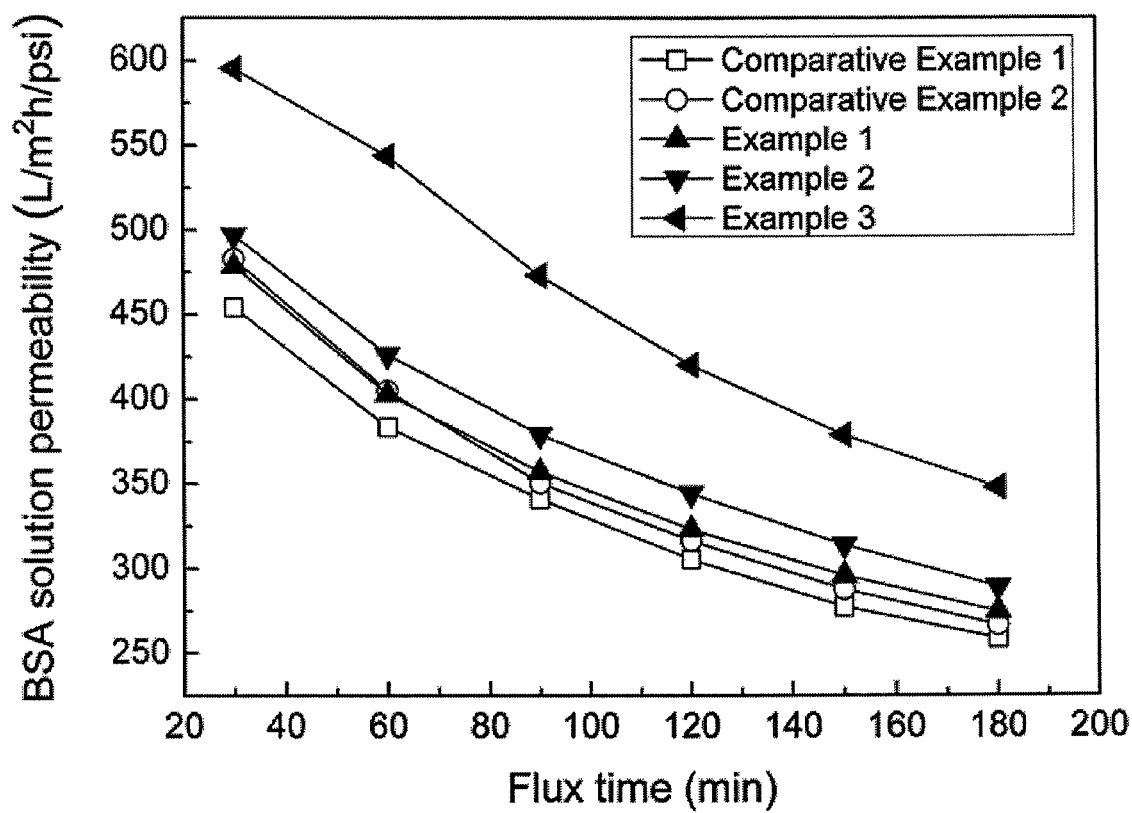
FIG. 5 illustrates permeation results obtained when penetrating a solution containing 1,000 mg/L of BSA into a PDVF MF membrane hydrophilicized after cleaning.

As illustrated in FIG. 5, a flux of the BSA solution passing through a pristine PVDF MF membrane before coating was decreased from 454 LMH/psi in the initial BSA solution permeation stage to 259 LMH/psi after 180 minutes in the comparative example 1, and a flux of the BSA solution passing through a commercially available hydrophilic PVDF MF membrane was decreased from 483 LMH/psi in the initial stage of the BSA solution to 266 LMH/psi after 180 minutes in the comparative example 2. On the other hand, it could be seen that the PVDF MF membranes were almost equal to or slightly increased than the commercially available hydrophilic PVDF MF membrane since PVDF MF membranes coated with small amounts of PEGDA in examples 1 and 2 were 478 LMH/psi and 496 LMH/psi in the initial stage of the BSA solution and were 274 LMH/psi and 298 LMH/psi after 180 minutes. It could be seen that the hydrophilic PVDF MF membrane was far excellent in flux than the pristine PVDF MF membrane before coating or commercially available hydrophilic PVDF MF membrane since a flux of the hydrophilic PVDF MF membrane was decreased from 593 LMH/psi in the initial stage of the BSA solution to 348 LMH/psi after 180 minutes when hydrophilicizing the PVDF MF membrane by increasing the amount of PEGDA coated in the example 3. Therefore, a membrane with excellent permeation of the BSA solution was manufactured by the hydrophilicization using the amount of PEGDA less than that of the commercially available PVDF MF membrane in the comparative example 2.

Figure 6:
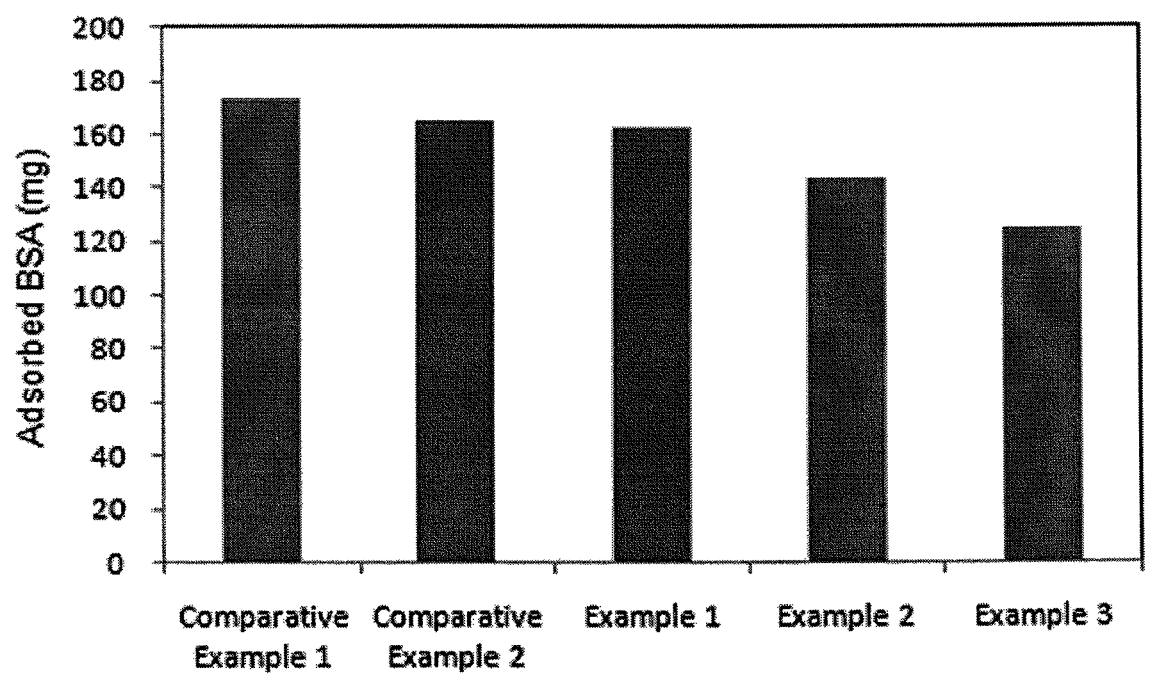
FIG. 6 shows protein adsorption characteristics of the PDVF MF membrane contaminated after penetrating a solution containing 1,000 mg/L of BSA into a PDVF MF membrane hydrophilicized after cleaning.

As illustrated in FIG. 6, the amount of adsorbed BSA on the pristine PVDF MF membrane before coating was 174 mg in the comparative example 1, and the amount of adsorbed BSA on the commercially available hydrophilic PVDF MF membrane was 166 mg in the comparative example 2. Thus the commercially available hydrophilic PVDF MF membrane retains slightly lower BSA absorption characteristics. On the other hand, it could be seen that the amount of adsorbed BSA was slightly reduced compared to the commercially available hydrophilic PVDF MF membrane in the comparative example 2 since the amount of BSA adsorbed onto the PVDF MF membrane was 163 mg when the amount of PEGDA coated in example 1 was small. When increasing amounts of PEGDA coated in the examples 2 and 3, the amounts of adsorbed BSA were 144 mg and 125 mg respectively. Therefore, it could be confirmed that the amounts of BSA adsorption were far less than those of the pristine PVDF MF membrane before coating of the comparative example 1 and the commercially available hydrophilic PVDF MF membrane of the comparative example 2. Accordingly, it was confirmed that the hydrophilicized PVDF MF membrane had a very high resistance value against contamination by the adsorption of BSA when hydrophilicizing the membrane using liquid carbon dioxide.

TABLE 1

| Classification | Atomic Oxygen composition by XPS | Inherent membrane resistance (Rm) | External fouling resistance of the membrane (Rc) | Internal fouling resistance of the membrane (Ri) |
| --- | --- | --- | --- | --- |
| Example 1 | 0.9 | 9.03 | 0.46 | 5.84 |
| Example 2 | 4.2 | 8.57 | 0.96 | 5.18 |
| Example 3 | 8.4 | 7.13 | 0.15 | 4.74 |
| Example 4 | 8.4 | 7.20 | 0.11 | 4.20 |
| Example 5 | 8.8 | 7.31 | 0.12 | 4.32 |
| Comparative Example 1 | 0 | 9.58 | 0.09 | 6.70 |
| Comparative Example 2 | 19.1 | 9.30 | 1.82 | 6.23 |

As listed in table 1, the inherent membrane resistance of the pristine PVDF MF membrane before coating and the commercially available PVDF MF membrane was 9.58 and 9.30, respectively. Thus there was almost no change in the membrane inherent resistance values between the pristine PVDF MF membrane and the commercial hydrophilic PVDF membrane. In contrast, it could be seen that the inherent resistance values of the hydrophilic PVDF MF membranes manufactured using liquid carbon dioxide as a coating solvent were lower than those of the pristine PVDF MF membrane and the commercial hydrophilic PVDF membrane.

A external fouling resistance value of the commercially available hydrophilic PVDF MF membrane in the comparative example 2 was 1.82 which was much greater than a external fouling resistance value of 0.09 for the pristine PVDF MF membrane before coating in the comparative example 1 since the BSA was adsorbed on the hydrophilic membrane and a cake layer was formed on the surface of the commercially available hydrophilic PVDF MF membrane in the comparative example 2. External fouling resistance values of the hydrophilic PVDF MF membranes manufactured using liquid carbon dioxide as a coating solvent in the example 1 to 3 was 0.96 to 0.15. All values were much lower than the external fouling resistance value of the commercially available PVDF MF membrane in the comparative example 2. This is because a hydrophilicization degree of hydrophilic PVDF MF membranes using liquid carbon dioxide in the examples 1 to 3 was controlled to retain low external membrane fouling resistance. It was confirmed that the internal membrane fouling resistance value of the pristine PVDF MF membrane in the comparative example 1 was similar to that of the commercially available hydrophilic PVDF MF membrane in the comparative example 2. In contrast, it could be confirmed that the internal fouling resistance value of the hydrophilic PVDF MF membrane was lower than those of the pristine PVDF MF membrane before coating and a commercially available hydrophilic PVDF MF membrane. The internal fouling resistance value of the hydrophilic PVDF MF membrane manufactured by coating a relatively small amount of PEGDA using liquid carbon dioxide in the example 1 was decreased to 5.84. In addition, it was confirmed that the internal fouling resistance values of the membranes were further lowered to 4.74~5.18 when coating the PVDF MF membranes with increased amounts of PEGDA in the examples 2 and 3. Accordingly, it was confirmed that a PVDF membrane hydrophilicized using liquid carbon dioxide exhibited excellent permeation characteristics of the BSA solution compared to the pristine PVDF MF membrane before coating or the commercially available PVDF MF membrane, and the PVDF membrane hydrophilicized using liquid carbon dioxide was excellent in the internal fouling resistance as well as the external fouling resistance value with respect to the BSA adsorption compared to the pristine PVDF membrane before coating or the commercially available PVDF membrane. This is because the coating materials easily penetrated into the micropores of the membranes such that the coating material was uniformly coated on inner parts of the membranes as well as surfaces of the membrane since liquid carbon dioxide had a surface tension and a viscosity much lower than those of water or conventional organic solvents.

Further, as represented by the foregoing table 1, it could be seen that the internal fouling resistance value and the external fouling resistance value of the membrane of the example 4 were substantially reduced when comparing with those of the membranes of the comparative examples 1 and 2 after hydrophilicizing a PVDF MF membrane by using PEGMA instead of PEGDA, using TMPTMA as a cross-linking agent, and using liquid carbon dioxide as a subcritical fluid in the example 4. Therefore, it could be confirmed that the micropores as well as surfaces of the PVDF MF membranes could be uniformly hydrophilicized even when PEGMA was used and a proper cross-linking agent was used. In addition, it could be seen that the internal fouling resistance value and the external fouling resistance value of the membrane of the example 5 were much lower compared with those of the membranes of the comparative examples 1 and 2 even in a case that supercritical carbon dioxide is used instead of liquid carbon dioxide in the example 5. Therefore, it could be confirmed that the micropores as well as surfaces of the PVDF MF membranes could be uniformly hydrophilicized even when supercritical carbon dioxide was used instead of liquid carbon dioxide.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a hydrophilic membrane having improved antifouling property using a supercritical fluid or a subcritical fluid, the method comprising:
    introducing a hydrophilic group-containing monomer, an initiator and a cross-linking agent into a high pressure solution vessel, introducing a supercritical fluid or subcritical fluid into the high, thereby dissolving a mixture of the hydrophilic group-containing monomer, initiator and cross-linking agent in the supercritical fluid or subcritical fluid to prepare a coating solution (Step 1);
    fixing membranes onto an internal heater in a high pressure coating vessel, pressurizing the high pressure coating vessel such that a pressure of the high pressure coating vessel is identical to that of the high pressure solution vessel, and transferring coating material from the high pressure solution vessel to the high pressure coating vessel to contact the coating material with the membranes (Step 2);
    coating the monomer, initiator and cross-linking agent contacted with the membranes in Step 2 on surfaces and micropores of the membranes through a cross-linking reaction and a polymerization reaction (Step 3);
    lowering temperature of the internal heater in the high pressure coating vessel and transferring non-reacted coating material to the high pressure solution vessel again (Step 4); and
    lowering pressure of the high pressure coating vessel to the atmospheric pressure, recovering manufactured hydrophilicized membranes, and cleaning and drying the recovered hydrophilicized membranes (Step 5).

2. The method as set forth in claim 1, wherein the supercritical fluid or subcritical fluid in Step 1 is selected from the group consisting of liquid carbon dioxide, supercritical carbon dioxide, supercritical 1,1,1,2-tetrafluoroethane (HFC 134a), supercritical difluoromethane (HFC 32), supercritical pentafluoroethane (HFC 125), supercritical methane, supercritical ethane, supercritical propane, and combinations thereof.

3. The method as set forth in claim 1, wherein the hydrophilic group-containing monomer in Step 1 is a monomer containing one or more hydrophilic groups selected from the group consisting of a hydroxyl functional group (—OH), a carboxyl acid functional group (—COOH), an alkylene oxide functional group (—R—O—), and an amine functional group (—NH2).

4. The method as set forth in claim 1, wherein the cross-linking agent in Step 1 is selected from the group consisting of acrylate, methacrylate, trimethylolpropane trimethylacrylate (TMPTMA), polyethylene glycol ethyl diacrylate (PEGDA) and polyethylene glycol ethyl dimethacrylate (PEGDMA) having two or more double bonds, and combinations thereof.

5. The method as set forth in claim 1, wherein the initiator in Step 1 is selected from the group consisting of 2,2'-azobis (2-methylpropionitrile), 2,2'-azobis(4-methoxy-2,4-dimethyl valeronitrile), 2,2'-azobis(2,4-dimethyl valeronitrile), dimethyl 2,2'-azobis(2-methylpropionate), 2,2'-azobis(2-methylbutyronitrile), 1,1'-azobis(cyclohexane-1-carbonitrile), and combinations thereof.

6. The method as set forth in claim 1, wherein, when the supercritical fluid is used in Step 1, the method comprises controlling a temperature to a range of 30° C. to 100° C., and controlling a pressure to a range of 40 bar to 500 bar.

7. The method as set forth in claim 1, wherein, when liquid carbon dioxide is used in Step 1 as the subcritical fluid, the method comprises controlling a temperature to a range of 0° C. to 30° C., and controlling a pressure to a range of 30 bar to 200 bar.

8. The method as set forth in claim 1, wherein the monomer in Step 1 has a concentration range of 0.1% by weight to 20% by weight.

9. The method as set forth in claim 1, wherein the cross-linking agent in Step 1 has a concentration range of 0.001% by weight to 10% by weight.

10. The method as set forth in claim 1, wherein the initiator in Step 1 has a concentration range of 0.0001% by weight to 1% by weight.

11. The method as set forth in claim 1, wherein coating material of the hydrophilic group-containing monomer, cross-linking agent and initiator dissolved into a supercritical fluid or subcritical fluid in Step 2 is brought into contact with membranes for 10 minutes to 48 hours.

12. The method as set forth in claim 1, wherein material for the membranes in Step 2 is anyone selected from the group consisting of polyethylene (PE), polypropylene (PP), polycarbonate (PC), polyimide (PI), polyetherimide (PEI), polysulfone (PSF), polyethersulfone (PES), polyvinylidene difluoride (PVDF), and polytetrafluoroethylene (PTFE).

13. The method as set forth in claim 1, wherein the method comprises controlling a temperature to 30° C. to 150° C. during the polymerization reaction and cross-linking reaction in Step 3.

14. The method as set forth in claim 1, wherein the method comprises controlling a reaction time to 10 minutes to 10 hours during the polymerization reaction and cross-linking reaction in Step 3.

15. The method as set forth in claim 1, wherein the cleaning process in Step 5 is carried out in such a way that non-reacted monomer, initiator and cross-linking agent physically adsorbed onto the hydrophilicized membranes are eliminated using water or organic solvents.

16. A hydrophilic membrane having improved antifouling property manufactured by a method recorded in claim 1, the hydrophilic membrane comprising membranes having surfaces and pores manufactured from material selected from the group consisting of polyethylene (PE), polypropylene (PP), polycarbonate (PC), polyimide (PI), polyetherimide (PEI), polysulfone (PSF), polyethersulfone (PES), polyvinylidene difluoride (PDVF) and polytetrafluoroethylene (PTFE); and a monomer containing one or more hydrophilic groups selected from the group consisting of trimethylolpropane trimethylacrylate (TMPTMA), polyethylene glycol ethyl diacrylate (PEGDA) and polyethylene glycol ethyl dimethacrylate (PEGDMS) and combinations thereof, which are coated on surfaces of the membranes and coated in pores of the membranes.

17. The hydrophilic membrane as set forth in claim 16, wherein the hydrophilic membrane is applied to microfiltration membranes, ultrafiltration membranes, nanofiltration membranes, and reverse osmosis membranes.

* * * * *